US012644259B2

(12) United States Patent
Sanerma et al.

(10) Patent No.: US 12,644,259 B2
(45) Date of Patent: Jun. 2, 2026

(54) AUTONOMOUS MINE VEHICLE OPERATION

(71) Applicant: SANDVIK MINING AND CONSTRUCTION OY, Tampere (FI)

(72) Inventors: Simo Sanerma, Tampere (FI); Antti Lehtinen, Tampere (FI); Teemu Parkkinen, Lempaala (FI); Esa Pajala, Tampere (FI); Riku Pulli, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 321 days.

(21) Appl. No.: 17/610,576

(22) PCT Filed: May 12, 2020

(86) PCT No.: PCT/EP2020/063225
§ 371 (c)(1),
(2) Date: Nov. 11, 2021

(87) PCT Pub. No.: WO2020/229489
PCT Pub. Date: Nov. 19, 2020

(65) Prior Publication Data
US 2022/0251809 A1 Aug. 11, 2022

(30) Foreign Application Priority Data
May 14, 2019 (EP) ..................................... 19174444

(51) Int. Cl.
| | |
|---|---|
| *E02F 9/26* | (2006.01) |
| *E02F 9/20* | (2006.01) |
| *G05D 1/00* | (2024.01) |

(52) U.S. Cl.
CPC .............. *E02F 9/268* (2013.01); *E02F 9/205* (2013.01); *G05D 1/0061* (2013.01);
(Continued)

(58) Field of Classification Search
CPC . G05D 1/024; G05D 1/0278; G05D 2201/021
(Continued)

(56) References Cited

U.S. PATENT DOCUMENTS 10,611,369 B2 * 4/2020 Cinpinski ............. B60R 21/013
2011/0160920 A1 6/2011 Orr et al.
(Continued)

FOREIGN PATENT DOCUMENTS

EP 2921363 A1 9/2015
JP 2015026312 * 2/2015 ............... G08G 1/16
(Continued)

*Primary Examiner* — Helal A Algahaim
*Assistant Examiner* — John D Holman
(74) *Attorney, Agent, or Firm* — Corinne R. Gorski

(57) ABSTRACT

A method for controlling autonomous mine vehicle operations includes the steps of detecting a dust condition for an autonomously operating mine vehicle performing optical environment scanning for positioning the mine vehicle at a worksite, transitioning the mine vehicle operating in an automatic driving mode to a dust driving mode in response to detecting the dust condition, the dust driving mode being associated with one or more control actions for autonomous operation of the mine vehicle, controlling dead-reckoning based positioning for updating the position of the mine vehicle during the dust driving mode, monitoring of a dead-reckoning error parameter during the dust driving mode, and in response to the dead-reckoning error parameter reaching an error threshold, controlling the mine vehicle to stop or reduce speed.

17 Claims, 3 Drawing Sheets

(52) U.S. Cl.
CPC ........... *G05D 1/0066* (2013.01); *G05D 1/024*
(2013.01); *G05D 1/0278* (2013.01)

(58) Field of Classification Search
USPC .......................................................... 701/50
See application file for complete search history.

(56) References Cited

U.S. PATENT DOCUMENTS

| | | | |
|---|---|---|---|
| 2013/0197760 A1* | 8/2013 | Castaneda ........... | B66F 9/07509 |
| | | | 701/41 |
| 2016/0185346 A1 | 6/2016 | Awamori et al. | |
| 2016/0341041 A1* | 11/2016 | Puura ................... | G01S 7/4865 |
| 2017/0122741 A1 | 5/2017 | Sakai et al. | |
| 2020/0193193 A1* | 6/2020 | Okada .................. | G06V 20/586 |

FOREIGN PATENT DOCUMENTS

| | | |
|---|---|---|
| WO | 02061515 A2 | 1/2001 |
| WO | 2015106799 A1 | 7/2015 |
| WO | 2017199160 A1 | 5/2017 |

\* cited by examiner

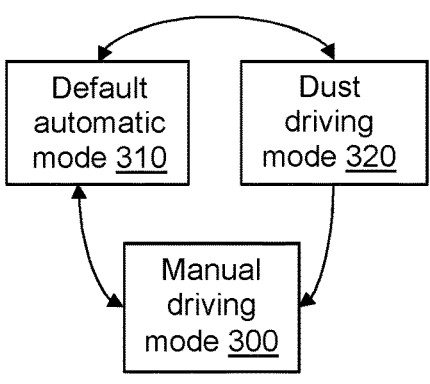

Fig. 3

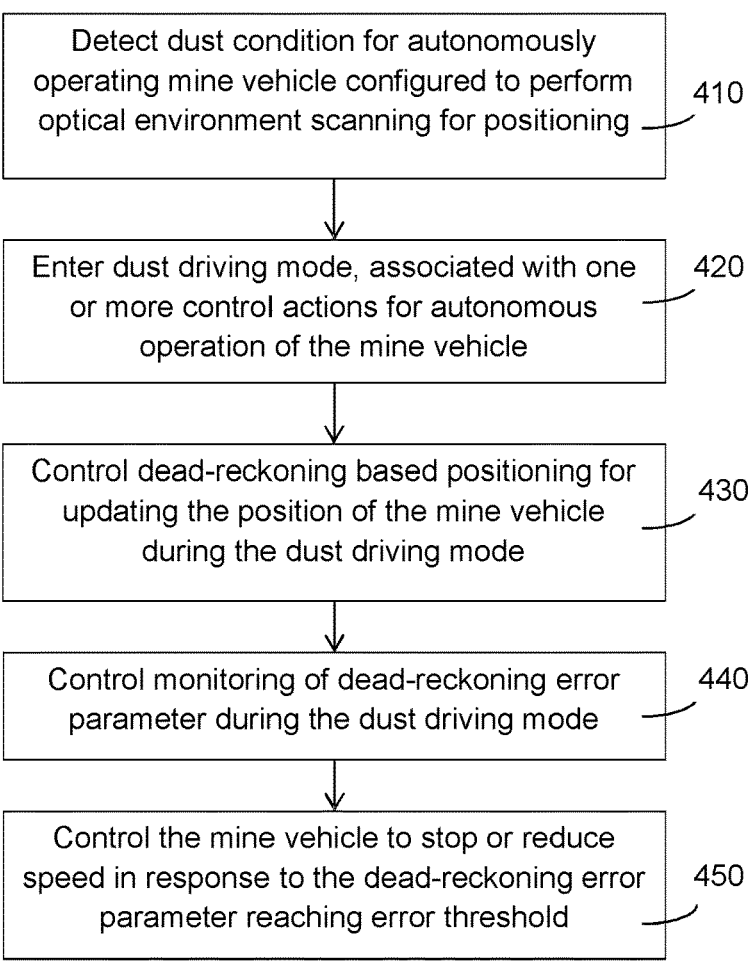

Detect dust condition for autonomously operating mine vehicle configured to perform optical environment scanning for positioning — 410

Enter dust driving mode, associated with one or more control actions for autonomous operation of the mine vehicle — 420

Control dead-reckoning based positioning for updating the position of the mine vehicle during the dust driving mode — 430

Control monitoring of dead-reckoning error parameter during the dust driving mode — 440

Control the mine vehicle to stop or reduce speed in response to the dead-reckoning error parameter reaching error threshold — 450

Fig. 4

AUTONOMOUS MINE VEHICLE OPERATION

RELATED APPLICATION DATA

This application is a § 371 National Stage Application of PCT International Application No. PCT/EP2020/063225 filed May 12, 2020 claiming priority to EP 19174444.0 filed May 14, 2019.

FIELD

The present invention relates to autonomous mine vehicle operations, and in particular to autonomous operations modes of such vehicles.

BACKGROUND

Mining or construction excavation worksites, such as hard rock or soft rock mines, may comprise areas for automated operation of mobile mine vehicles, herein referred to as mine vehicles. A mine vehicle may be an unmanned, e.g. remotely controlled from a control room, or a manned mine vehicle, i.e. operated by an operator in a cabin of the mobile vehicle. Mine vehicles may be autonomously operating, i.e. automated or semi-automated mine vehicles, which in their normal operating mode operate independently without external control but which may be taken under external control at certain operation areas or conditions, such as during states of emergencies.

Mine vehicles may comprise one or more sensors for scanning environment of the mine vehicle, to detect obstacles and/or tunnel wall surface, for example. Such sensors may also be optical scanning devices, such as two-dimensional laser scanning devices, and may be referred to as environment scanning sensors. Position tracking may be arranged particularly in underground mines on the basis of scanning data from the sensor(s) and a predefined environmental model. WO2015106799 discloses a system for scanning surroundings of a vehicle for producing data to determining position and orientation of the vehicle. The vehicle is provided with a reference point cloud data of the mine. The control unit is configured to match second point cloud data produced by a scanning device of the vehicle to the reference point cloud data in order to determine position data of the vehicle.

Dust may cause disturbances in sensor-based operations. Sensors may be unable to detect an obstacle due to large amount of dust or incorrectly detect dust as an obstacle. This may lead to reduced mine operations efficiency or even accidents. There is a need for further improvements to avoid or alleviate such problems.

SUMMARY

The invention is defined by the features of the independent claims. Some specific embodiments are defined in the dependent claims.

According to a first aspect of the present invention, there is provided an apparatus, being configured to or comprising means configured for performing at least: detecting a dust condition for an autonomously operating mine vehicle performing optical environment scanning for positioning the mine vehicle at a worksite, transitioning the mine vehicle operating in an automatic driving mode to a dust driving mode in response to detecting the dust condition, the dust driving mode being associated with one or more control actions for autonomous operation of the mine vehicle and comprises or defines one or more control actions applied for limiting autonomous driving of the mine vehicle, controlling dead-reckoning based positioning for updating the position of the mine vehicle during the dust driving mode, monitoring of a dead-reckoning error parameter during the dust driving mode, and in response to the dead-reckoning error parameter reaching an error threshold, controlling the mine vehicle to stop or reduce speed According to a second aspect of the present invention, there is provided a method for controlling autonomous operation of a mine vehicle, comprising: detecting a dust condition for an autonomously operating mine vehicle performing optical environment scanning for positioning the mine vehicle at a worksite, transitioning the mine vehicle operating in an automatic driving mode to a dust driving mode in response to detecting the dust condition, the dust driving mode being associated with one or more control actions for autonomous operation of the mine vehicle and comprises or defines one or more control actions applied for limiting autonomous driving of the mine vehicle, controlling dead-reckoning based positioning for updating the position of the mine vehicle during the dust driving mode, monitoring of a dead-reckoning error parameter during the dust driving mode, and in response to the dead-reckoning error parameter reaching an error threshold, controlling the mine vehicle to stop or reduce speed According to a third aspect, there is provided an apparatus comprising at least one processing core, at least one memory including computer program code, the at least one memory and the computer program code being configured to, with the at least one processing core, cause the apparatus at least to perform the method or an embodiment of the method.

According to a fourth aspect, there is provided a computer program, a computer program product or (a non-tangible) computer-readable medium comprising computer program code for, when executed in a data processing apparatus, to cause the apparatus to perform the method or an embodiment thereof.

According to an embodiment of any of the aspects, speed reduction for the mine vehicle is controlled in response to entering the dust driving mode.

According to an embodiment of any of the aspects, scanner response signals, are analyzed and the dust condition is detected on the basis of the scanner response signal analysis.

According to an embodiment of any of the aspects, obstacle detection function by the mine vehicle is disabled in response to entering the dust driving mode.

According to an embodiment of any of the aspects, a wheel block detection function is controlled in response to entering the dust driving mode, and the mine vehicle is controlled to stop in response to detecting a wheel block by the wheel block detection function.

According to an embodiment of any of the aspects, collision detection function is controlled for the mine vehicle in response to entering the dust driving mode, and the mine vehicle is controlled to stop in response to detecting a collision by the collision detection function.

An embodiment of any of the aspects further comprises detecting the dust condition and/or entering the dust driving mode in response to detecting at least one of an operator input, the mine vehicle entering an area for which a dust driving mode has been defined in a route data or environment data processed for the mine vehicle, a signal from a dust detector indicative of or causing the dust condition, and a number of detected points in an environment model identified based on the scanning falling below a threshold value.

An embodiment of any of the aspects further comprises monitoring time that the mine vehicle has been in the dust driving mode and/or monitoring distance travelled by the mine vehicle during the dust driving mode, and controlling the mine vehicle to stop in response to detecting that a maximum time or maximum distance for the dust driving mode is reached.

An embodiment of any of the aspects further comprises monitoring environment of the mine vehicle during the dust driving mode, and disabling the dust driving mode in response to detecting a dust driving mode exit condition, such as again successfully positioning the mine vehicle by scanning-based positioning or detecting one or more dust condition parameters falling below a dust condition threshold. The dust driving mode may be exited in response to again successfully positioning the mine vehicle based on optical scanning or in response to detecting one or more dust condition parameters falling below a dust condition threshold.

An embodiment of any of the aspects further comprises notifying an operator of the dust condition and/or entering the dust driving mode.

An embodiment of any of the aspects further comprises detecting availability of satellite-based positioning for the mine vehicle, and preventing entering the dust driving mode or disabling the dust driving mode when position of the mine vehicle is defined based on the satellite-based positioning.

An embodiment of any of the aspects further comprises determining position of the mine vehicle on the basis of comparison of tunnel profile data and reference profile data stored in an environment model to correct dead-reckoning based position before entering the dust driving mode and determine the position during the dust driving mode without positioning based on the optical environment scanning, such as correcting dead-reckoning based position on the basis of the optical environment scanning.

An embodiment of any of the aspects further comprises accumulating latitudinal error and longitudinal error in response to entering the dust driving mode, wherein the longitudinal error and/or the latitudinal error is estimated on the basis of recent historical error correction to dead-reckoning based on the optical environment scanning positioning before entering the dust driving mode. The accumulated latitudinal error and/or longitudinal errors may be compared to maximum allowed error threshold value(s), which may also be referred to or associated with safety margin for the mine vehicle. In response to a maximum allowed error threshold value(s) being exceeded, the mine vehicle may be stopped or speed further reduced.

BRIEF DESCRIPTION OF THE DRAWINGS

FIG. 3 illustrates example driving modes of an autonomous mine vehicle;

FIG. 4 illustrates a method according to at least some embodiments;

EMBODIMENTS

The term mine vehicle herein refers generally to mobile work machines suitable to be used in the operation of different kinds of mining and/or construction excavation worksites, such as lorries, dumpers, vans, mobile rock drilling or milling rigs, mobile reinforcement machines, bucket loaders or other kind of mobile work machines which may be used in different kinds of surface and/or underground excavation worksites. Hence, the term mine vehicle is not limited in any way to vehicles only for ore mines, but the mine vehicle may be a mobile work machine used at excavation sites. The term autonomously operating mobile vehicle herein refers to automated or semi-automated mobile vehicles, which in their autonomous operating mode may operate/drive independently without requiring continuous user control but which may be taken under external control during states of emergencies, for example.

Figure 1:
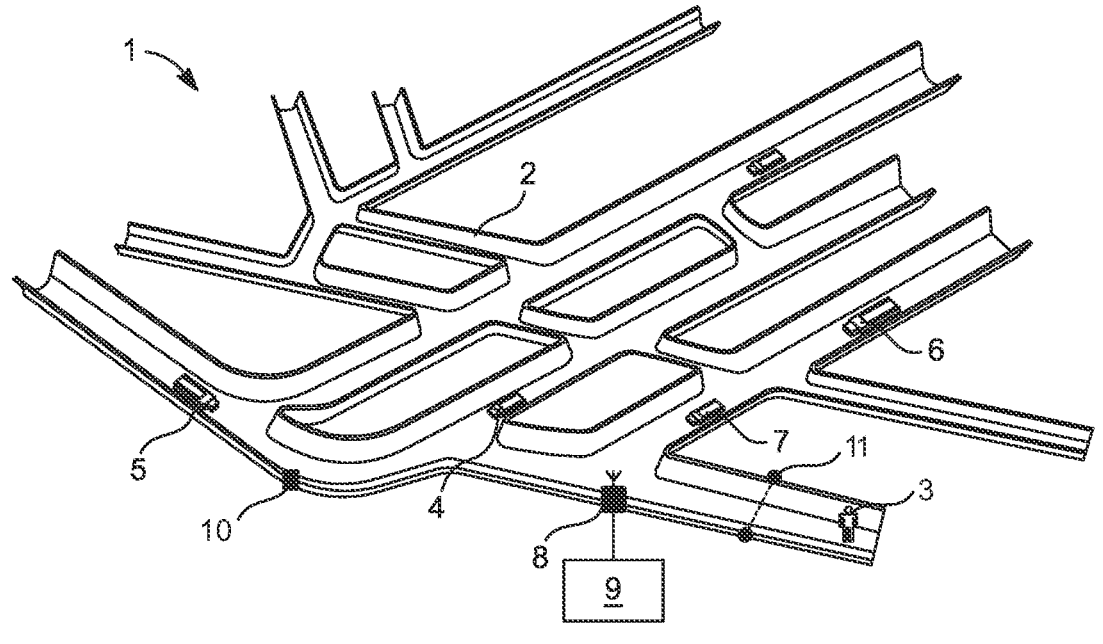
FIG. 1 illustrates an example of a mine worksite.

FIG. 1 illustrates a simplified example of a mine 1, in the present example an underground mine comprising a network 2 of underground tunnels. A plurality of mobile objects, such as persons or pedestrians 3 and/or mine vehicles 4, 5, 6, 7 may be present in and move between different areas or operation zones of the worksite 1.

The worksite 1 comprises a communications system, such as a wireless access system comprising a wireless local area network (WLAN), comprising a plurality of wireless access nodes 8. The access nodes 8 may communicate with wireless communications units comprised by the mine vehicles or carried by the pedestrians and with further communications devices (not shown), such as network device(s) configured to facilitate communications with a control system 9, which may be an on-site (underground or above-ground) and/or remote via intermediate networks. For example, a server of the system 9 may be configured to manage at least some operations at the worksite, such as provide a UI for an operator to remotely monitor and, when needed, control automatic operation operations of the mine vehicles and/or assign work tasks for a fleet of vehicles and update and/or monitor task performance and status.

The system 9 may be connected to a further network(s) and system(s), such a worksite management system, a cloud service, an intermediate communications network, such as the internet, etc. The system may comprise or be connected to further device(s) or control unit(s), such as a handheld user unit, a vehicle unit, a worksite management device/system, a remote control and/or monitoring device/system, data analytics device/system, sensor system/device, etc.

The worksite 1 may further comprise various other types of mine operations devices 10 connectable to the control system 9 e.g. via the access node 8, not in detail illustrated in FIG. 1. Examples of such further mine operations devices 10 include various devices for power supply, ventilation, air condition analysis, safety, communications, and other automation devices. For example, the worksite may comprise a passage control system comprising passage control units (PCU) 11 separating operation zones, some of which may be set-up for autonomously operating mine vehicles. The passage control system and associated PCUs may be configured to allow or prevent movement of one or more mine vehicles and/or pedestrians between zones.

Figure 2:
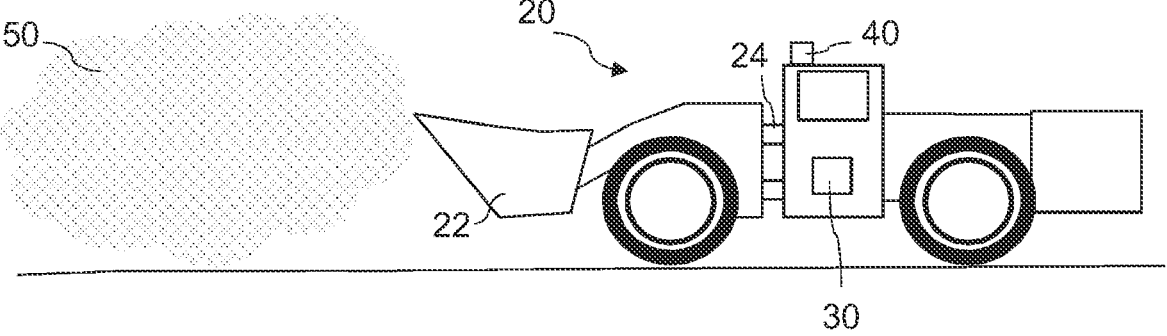
FIG. 2 illustrates an example of an autonomous mine vehicle in accordance with some embodiments.

FIG. 2 illustrates a mine vehicle 20, in this example a loader or a load and haul (LHD) vehicle comprising a bucket 22. The mine vehicle 20 may be an articulated vehicle comprising two sections connected by a joint 24. However, it will be appreciated that application of the presently disclosed autonomous driving mode features is not limited to any particular type of mine vehicle.

The mine vehicle 20 comprises at least one control unit 30 configured to control at least some functions and/or actuators of the mine vehicle. The control unit 30 may comprise one or more computing units/processors executing computer program code stored in memory. The control unit may be connected to one or more other control units of a control system of the mine vehicle, in some embodiments by a controller area network (CAN) bus. The control unit may comprise or be connected to a user interface with a display device as well as operator input interface for receiving operator commands and information to the control unit.

In some embodiments, the control unit 30 is configured to control at least autonomous operation control related operations, and there may be one or more other control units in the mine vehicle for controlling other operations. It is to be appreciated that the control unit 30 may be configured to perform at least some of the below illustrated features, or a plurality of control units or controllers may be applied to perform these features. There may be further operations modules or functions performed by the control unit(s), e.g. an automatic driving mode selection function, at least one positioning unit/module/function, and/or an obstacle detection function.

The mine vehicle 20 may be unmanned. Thus, the user interface may be remote from the vehicle and the vehicle may be remotely controlled by an operator in the tunnel, or in control room at the mine area or even long distance away from the mine via communications network(s). A control unit outside the mine vehicle 20, for example in the control system 9 may be configured to perform some of the below illustrated features.

The mine vehicle 20 comprises one or more scanning units, or scanners 40, configured to perform scanning of the environment of the mine vehicle. In an embodiment, the scanner 40 may be a 2D scanner configured to monitor tunnel walls at desired height, for example. The control unit 30 may compare operational scanned tunnel profile data to reference profile data stored in an environment model and position the mine vehicle on the basis of finding a match in the environment model to position the mine vehicle and/or correct positioning by dead-reckoning.

In some embodiments, 3D scanner is applied, in which case 3D scanning data or point cloud data is produced and applied for positioning the mine vehicle. Point cloud data generated on the basis of scanning may be applied for generating and updating an environment model, such as an underground tunnel model, which may be applied for positioning the mine vehicle at the worksite. In some embodiments, the scanning results are applied to detect position and orientation of the mine vehicle and one or more further elements thereof, such as the scanner 40 or the bucket 22.

The mine vehicle 20 or the control unit 30 thereof may execute a point cloud matching functionality for matching operational (scanned) point cloud data (being scanned by the scanner(s) 40) to environment model point cloud data, i.e. reference point cloud data. Position and direction of the scanning device and/or another interest point of the vehicle, such as the (leading edge of the) bucket 22, may be determined in the mine coordinate system on the basis of the detected matches between the operational point cloud data and the reference cloud data.

A driving plan, or a route plan, may define a route to be driven by the mine vehicle 20 and may be used as an input for automatic control of the mine vehicle. The plan may be generated offline and off-site, for example in an office, or on-board the mine vehicle e.g. by a teaching drive. The plan may define a start point, an end point, and a set of route points for the automatic drive. Such plan may be sent via a wired or wireless connection to, or otherwise loaded to the mine vehicle, to a memory of the mine vehicle for access by the control unit 30.

There are now provided further improvements for autonomous mine vehicle operations, further illustrated below. FIG. 3 illustrates operational driving modes for a mine vehicle, such as the vehicle 20. When the mine vehicle is in a manual driving mode 300, an operator drives the mine vehicle manually, by remote control or locally at the mine vehicle by operator controls. The operator may set the mine vehicle into a (default) automatic driving mode 310 in which the mine vehicle drives automatically the specified route, e.g. between a loading point and a dump shaft. The transition from the manual mode 300 to the automatic driving mode 310 may require appropriate security clearance, such as acknowledging passage control system for the automatic operation area.

The mine vehicle 20 may automatically transition from the default automatic mode 310 to a dust driving mode 320 in response to detecting a dust condition. The dust condition may be detected when the mine vehicle 20 operates in the automatic driving mode and corrects dead-reckoning based position based on the optical scanning based positioning, such as the positioning based on mapping of scanned tunnel profile data from 2D or 3D scanner and the environment model illustrated above, for example. The dust condition may be detected when the mine vehicle 20 enters a dust cloud 50, for example. The dust driving mode may comprise or define one or more control actions for limiting autonomous driving of the mine vehicle. The mine vehicle may be controlled to automatically return to the default automatic driving mode 310 upon termination of the dust condition, for example.

It is to be appreciated that various modifications or additions may be made to the modes of FIG. 3. For example, the dust driving mode may be a sub-mode or state of an automatic driving mode and may be indicated by a specific flag in the automatic driving procedure. There may be further driving modes (or profiles for a mode), such as a semi-automatic driving mode.

FIG. 4 illustrates a method according to some embodiments. The method may be performed by a mine vehicle and a controlling apparatus thereof, such as the mine vehicle 20, and by the control unit 30 thereof.

The method for controlling autonomous driving of a mine vehicle may comprise detecting 410 a dust condition for an autonomously operating mine vehicle performing optical environment scanning for positioning the mine vehicle at a worksite. The mine vehicle operating in an automatic driving mode is transitioned 420 to a dust driving mode in response to detecting the dust condition. The dust driving mode is associated with one or more control actions for autonomous operation of the mine vehicle. Thus, the dust driving mode may generally refer to a mode in which the associated control actions are performed for the mine vehicle to enable autonomous driving despite of dust.

Dead-reckoning based positioning is controlled 430 for updating the position of the mine vehicle during the dust driving mode. The position of the mine vehicle previously determined on the basis of scanning-based positioning may then be updated based on the dead-reckoning based positioning function of the mine vehicle.

Monitoring of a dead-reckoning error parameter is controlled 440 during the dust driving mode. In response to the dead-reckoning error parameter reaching an error threshold, the mine vehicle is controlled 450 to stop or reduce speed.

Thus, the mine vehicle is positioned by dead-reckoning and may continue autonomous driving despite of dust preventing scanner-based positioning, but within preconfigured error limit(s). The positioning based on the optical environment scanning may be turned off in response to entering the dust driving mode, or position results by the optical environment scanning may be neglected. Dust condition refers generally to a condition wherein the mine vehicle or an element thereof, such as scanner, is directly or indirectly detected to be affected by dust, e.g. when adequate number of matching environment model points are not any more found when entering a dust cloud. Controlling an action, e.g. in block 430 and 440, may refer to causing initiation or activation of the respective action (if required, i.e. in some cases such action may already being performed, whereby an activation signal may be obviously omitted). There is a plurality of options for arranging dust condition analysis and detection, one or more of which may be applied in/before block 410, some of which are illustrated below.

In some embodiments, the mine vehicle 20 may comprise one or more sensors providing operational environment data which is analysed for dust condition detection. In response to an analysed parameter defined on the basis of the analysis meeting at least one predefined threshold value, dust condition may be detected.

In some embodiments, the dust condition may be detected 410 and/or the dust driving mode entered 420 in response detecting at least one of:

An operator input. For example, an input to transition to the dust control mode 320 may be received from an operator monitoring the mine vehicle 20 via a remote monitoring unit.

The mine vehicle entering an area for which a dust driving mode has been defined in a route data or environment model data processed for the mine vehicle. Examples of such area include loading (or draw point) and unloading (or dump point) areas. Considerable dust may be present particularly at mine shaft dump point areas.

A signal from a dust detector indicative of or causing the dust condition. For example, the dust driving mode 320 may be entered 420 in response to detecting the amount of dust sensed by a dust detector to reach a (dust condition) threshold value.

A number of detected/matching points in an environment model identified based on the scanning falling below a threshold value.

The dust condition detection in block 410 may comprise analyzing scanner response signals. The control unit 30 may be configured to process information obtained on the basis of response signals received by the scanner(s) 40 and detect 410 the dust condition on the basis of the scanner response signal analysis.

In an embodiment, reflection or echo signals of a signal from the scanner 40 are analysed to detect the dust condition. The control unit 30 may be configured to identify presence of a dust cloud 50 on the basis of detecting multiple echoes that are identified to be caused by dust particles. The control unit 30 may be configured to detect a dust cloud based on amount of detected "bad measurements", referring to the amount of measurements the coordinates of which are far enough (exceeding a maximum deviation threshold value) from the environment model. When the amount of such measurements exceeds a limit value, the dust driving mode is entered 420. A further condition for entering the dust driving mode 320 may be that current position confidence needs to be high enough when the dust cloud condition detected 410.

In block 430, progression of the mine vehicle 20 may be determined on the basis of a dead reckoning algorithm configured to accumulate the vehicle's travelled distance and heading on the basis of input signals indicative of vehicle wheel rotation and relative heading. The vehicle 20 may comprise a positioning unit, which may be part of the control unit 30 or separate from it, configured to perform at least some the dead reckoning based positioning and may also be configured to define the dead-reckoning error in response to block 430. It is to be appreciated that the system may comprise further operational modules supplementing dead reckoning based position tracking, such as a tyre slipping and/or wear compensation module.

Figure 5:
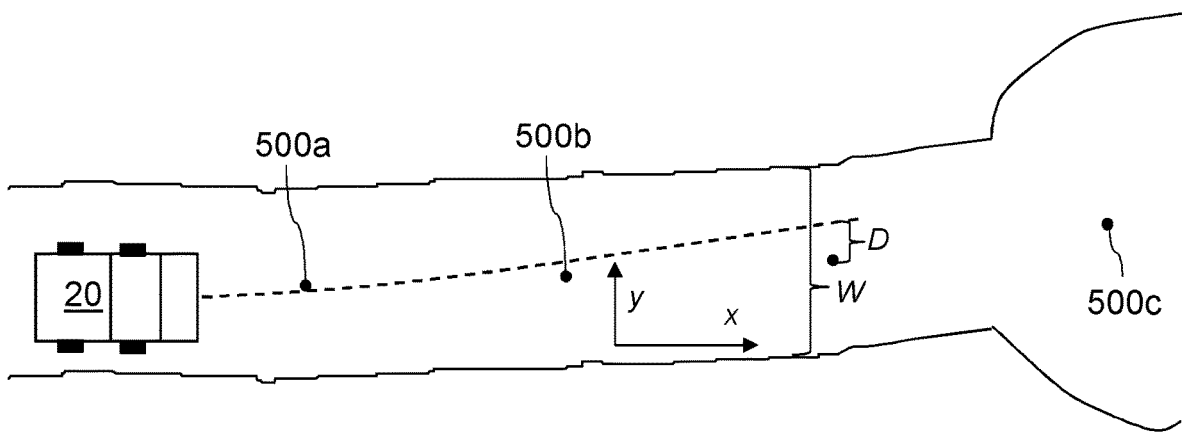
FIG. 5 illustrates a top view example of a mine vehicle and a worksite portion.

FIG. 5 illustrates a top-view example of the mine vehicle 20 driving along a route defined by a set of route points 500a, 500b, 500c. The broken line illustrates an example path and deviation from the route points caused by dead-reckoning positioning error during the dust driving mode.

In some embodiments, the positioning unit/control unit 30 accumulates latitudinal error (in direction y) and longitudinal error (direction x in the direction of driving) in response to entering the dust driving mode (and block 320) and while the mine vehicle 20 is moving. In an embodiment, the longitudinal and/or latitudinal error is estimated on the basis of recent historical error correction to dead-reckoning by the scanning-based positioning, e.g. such historical error correction data recorded for a predetermined time or distance before entering the dust driving mode. For example, the longitudinal error may be estimated based on preceding detected need for longitudinal error correction required for a given longitudinal distance before entering the dust driving mode. For example, the latitudinal error may be estimated on the basis of heading correction based on the scanning-based positioning for a predetermined distance or time before entering the dust driving mode. The latitudinal error may be corrected on the basis of change of corrected heading and heading obtained from a gyroscope of the mine vehicle 20. Such estimates may be filtered so that a trend is achieved, to avoid instant deviations affecting too much.

The accumulated latitudinal and/or longitudinal error(s) are compared to maximum allowed error threshold value(s), which may also be referred to or associated with safety margin for the mine vehicle. In response to a maximum allowed error threshold value(s) being exceeded, the mine vehicle 20 may be stopped or speed further reduced (block 450). When dust mode is exited these error counters are reset. Monitoring of the latitudinal error is particularly relevant in underground tunnels. For example, when the accumulated latitudinal error exceeds safety margin D, the mine vehicle is stopped. In an embodiment, an error ellipse is determined on the basis of accumulated latitudinal error and longitudinal error. In response to detecting the error ellipse to reach known tunnel width (which may be an estimate based on the environment model), the mine vehicle may be stopped.

The error threshold(s) applied in block 440 may be configurable. In some embodiments, the error threshold(s) are automatically configured based on the environment traversed by the mine vehicle and/or properties of the mine vehicle. The error threshold(s) may be configured on the basis of the environment model, route model, and/or path traversed by the mine vehicle during the dust driving mode.

In an example, width of the tunnel W is estimated on the basis of the environment model and the error threshold ET may define maximum allowed estimated vehicle distance from a wall and may be defined:

$$ET=W-(D+VW(\text{vehicle width}))$$

In some embodiments, time of the mine vehicle in the dust driving mode and/or distance travelled by the mine vehicle is monitored in the dust driving mode. The mine vehicle is controlled to stop in response to detecting that a maximum time or maximum distance for the dust driving mode is reached. In an embodiment, the allowed driving distance and/or time is affected by the environment model, route model, and/or path traversed by the mine vehicle during the dust driving mode. For example, if there is a curve on the route during the dust driving mode, the allowed driving distance and/or time is reduced/smaller. Thus, impact of path or route profile to the dead-reckoning accuracy may be taken into account.

There is a plurality of control actions that may be carried out in or in response to block 420, some of which are illustrated below.

In some embodiments, speed reduction for the mine vehicle is controlled in response to entering the dust driving mode. For example, the control unit 30 may reduce speed of the vehicle to a value in the range 2 to 10 km/h during the dust driving mode. The control unit 30 may set a speed limit for the vehicle. The speed of the vehicle may be reduced gradually to the associated value or range.

In some embodiments, an obstacle detection function, referring to a function for beforehand detecting an obstacle that the mine vehicle may hit, based on the information from the scanner(s) 40 is disabled in response to entering the dust driving mode. The obstacle detection function is performed based on the scanning results, and dust particles may cause incorrect detection of obstacle and stopping of vehicle or inappropriate corrective steering/deceleration actions.

In some embodiments, a wheel block detection function is activated in response to entering the dust driving mode. The wheel block detection function may be provided by an algorithm configured to process signals indicative of movement of the mine vehicle and detect that the mine vehicle has entered a wheel block, on the basis of detecting a match with a predetermined movement pattern or model. The mine vehicle 20 is controlled to stop in response to detecting a wheel block by the wheel block detection function.

In an embodiment, the wheel block detection function is activated only in proximity of an unloading/dump point area. Such an area may be defined in the environment model or route data (or in another input data set) for the mine vehicle. For example, the wheel block detection function may be activated only upon detecting a route segment comprising or preceding a dump point(s).

There may be further criterion for activating the wheel block detection function, such as distance to the dump point or end of a dump-point segment. For example, when the mine vehicle 20 enters, or is in the dust driving mode, enters/is on the dump-point segment, and the distance to the end of the segment is lower that an activation limit, wheel block detection and wheel block climbing detection algorithms are enabled. The wheel block climbing algorithm refers to an algorithm detecting if the vehicle starts to climb the wheel block. The vehicle is stopped (e.g. by controlling gear to neutral and service brakes on) if either of the two algorithms trigger.

In an example, when the mine vehicle 20 is about to enter a dump point (e.g. at route point 500c) and the dust driving mode is active, or when the vehicle is close to a dump point and enters dust driving mode:

The vehicle may transition to a dust dumping mode, where it follows predefined trajectory, but drops throttle so that it doesn't climb over the wheel block A boom controller of the vehicle may be controlled to raise the boom so it does not hit the wheel block, but does not allow beginning the dumping motion. For example, the bucket may be controlled close to its maximum upwards position.

The vehicle will drive forward up to a given maximum distance and the wheel block detection function monitors the vehicle movement to detect wheel block contact. If wheel block contact is successfully detected, dumping may proceed. If the wheel block is not detected within the maximum distance or wheel block climbing is detected, an error may be raised.

The dust driving mode is not entered if the dump point was reached before the dust condition was detected. Thus, entering the mode can be avoided when dust appears during dumping.

Accumulated position errors & timers tracking the duration of dust driving mode will persist during dumping in the dust driving mode. They do not advance unless the vehicle is moving.

In some embodiments, a collision (or impact/crash) detection function is controlled, i.e. activated (if not already activated), for the mine vehicle 20 in response to entering the dust driving mode. The mine vehicle is controlled to stop in response to detecting a collision to a wall or another obstacle by the collision detection function, which may be performed by the control unit 30 (or another unit).

When driving in the dust driving mode, the collision detection function may be configured to detect collision or scraping e.g. to a tunnel wall on the basis of processing inertial measurement and odometer information. In an example embodiment, speed of the vehicle may be continuously monitored, and in response to quick speed reduction (exceeding a trigger parameter), the collision detection function detects a collision. It is to be noted that the parameter for causing the collision detection may be configurable such that the collision is detected although the mine vehicle is still running (e.g. the vehicle speed needs to reduce 50% as compared to the preceding reference speed within time t).

The collision detection function may be configured to process 3D acceleration vectors for detecting deceleration triggering obstacle detection. For example, acceleration vectors may be processed or smoothed by two sliding windows of length "short" and "long". "Long" vector may indicate approximately direction of gravity, whereas the "short" vector may indicate in a low-pass filtered estimate of current vehicle acceleration. The function may calculate a projection of the short vector onto a plane orthogonal to long vector. In other words, a low-pass filtered lateral acceleration in relation to gravity is calculated. If the lateral acceleration exceeds a preconfigured limit value, a collision is detected.

Further parameter(s) may be used for the collision detection function for detecting collision during the dust driving mode. For example, wheel slip detection may be applied, and an error is raised (and the vehicle may be stopped) in response to detecting wheel slipping, which may be caused by the vehicle pushing against a wall and causing error in the dead-reckoning based positioning.

In some embodiments, the mine vehicle 20 continues to monitor environment of the mine vehicle during the dust driving mode, i.e. after block 420. Thus, the control unit 30 may continuously analyze the scanned data from the scanner(s) and try to find matching points in the environment model (in some embodiments as background process for the current driving segment in segment-based navigation) in order to again position the mine vehicle 20. Even though a complete match (number of matching points between the scanned data and the environment model is below predefined limit) is not found, the control unit 30 may be configured to utilize the matching points in order to further complement or check the dead-reckoning based positioning. In an embodiment, position correction using scanner(s) 40 is thus not turned off but gain of correction may be reduced according to the amount of beams detected to actually hit the walls. The scanner-based positioning may enter a specific mode or state during the dust driving mode, wherein correlation errors (between the scanned data and the environment model data) do not cause stopping of the vehicle.

The dust driving mode may be disabled in response to detecting a dust driving mode exit condition. Monitoring for the exit condition may be a further block in the method of FIG. 4 after block 430/440. Thus, the mine vehicle 20 may transition from the dust driving mode 320 to the default automatic driving mode 310, or in some cases to the manual driving mode 300 or stop. The dust driving mode exit condition may be termination of the dust condition or another trigger.

In some embodiments, the dust driving mode is exited in response to again successfully positioning the mine vehicle. The mine vehicle 20 may be again positioned in response to the number of detected points in an environment model (within an area being analyzed) reaching a predefined threshold value, i.e. resulting scanning-based positioning confidence is high enough.

In some embodiments, the dust driving mode may be disabled in response detecting one or more dust condition parameters falling below a dust condition threshold. For example, the dust driving mode 320 may be exited in response to detecting the amount of dust sensed by the dust detector to reduce below the threshold value.

In some embodiments, the mine vehicle 20 is configured to define an indication in route data or environment model data of dust condition and/or dust driving mode at an area of the worksite (that obstacles are neglected and interpreted as dust). For example, such indication may be defined for a dump point segment or route point 500c, at which there often may be substantial amount of dust present. Thus, when entering the segment or proceeding towards the route point 500c, the mine vehicle may automatically transition to the dust driving mode 320.

In some embodiments, an operator is notified of the dust condition and/or entering the dust driving mode 320. The control unit 30 may be configured to send information indicative of the mine vehicle transitioning to the dust driving mode via a wireless connection to the system 9 to be displayed at a UI of an operator unit. For example, such notification may be indicated by specific dust driving mode field of a signal comprising passage information signal transmitted from the vehicle 20 (e.g. comprising video information). The system may be configured to receive various inputs from the operator during the dust driving mode, such as input for transitioning to a manual operation mode, stopping the vehicle etc. A corresponding control signal is transmitted to the mine vehicle 20, and the control unit 30 may be configured to control the automatic operation of the mine vehicle 20 in accordance with the control signal during the dust driving mode.

In some embodiments, the mine vehicle 20 comprises a satellite-based positioning unit, such as a global positioning system (GPS) unit. The mine vehicle may be configured to have such positioning unit activated and search for positioning signal during the dust condition mode. When entering an area with positioning signal availability, the mine vehicle may be positioned accurately. The dust driving mode may be disabled when position of the mine vehicle can be defined based on the satellite-based positioning. In an embodiment, entering 420 the dust driving mode and/or monitoring for the dust condition is prevented when position of the mine vehicle is defined based on the satellite-based positioning.

It is to be appreciated that various further features may be complement or differentiate at least some of the above-illustrated embodiments. For example, there may be further user interaction and/or automation functionality further facilitating the operator to monitor the mine vehicle during the dust mode, select appropriate action to overcome an issue regarding boom trajectory/positioning, and control the mine vehicle.

In an embodiment, position of the mine vehicle 20 during the dust driving mode may be updated on the basis of an external location reference unit, if available. The location reference unit may be a wireless signal emission unit at a tunnel wall or a location tracking unit of another vehicle, for example. An RF tag, an access point, a visually readable code or another fixed unit the location of which is accurately known may serve as the location reference. Reference is also made to U.S. Pat. No. 7,899,599 disclosing that such identifier may be applied to update dead reckoning based location.

An electronic device comprising electronic circuitries may be an apparatus for realizing at least some embodiments illustrated above, such as the method illustrated in connection with FIG. 4 and features illustrated for the control unit 30. The apparatus may be comprised in at least one computing device connected to or integrated into a control system of the mine vehicle. Such control system may be an intelligent on-board control system controlling operation of various sub-systems of the mine vehicle, such as a hydraulic system, a motor, a rock drill, etc. Such control systems are often distributed and include many independent modules connected by a bus system of controller area network (CAN) nodes, for example.

Figure 6:
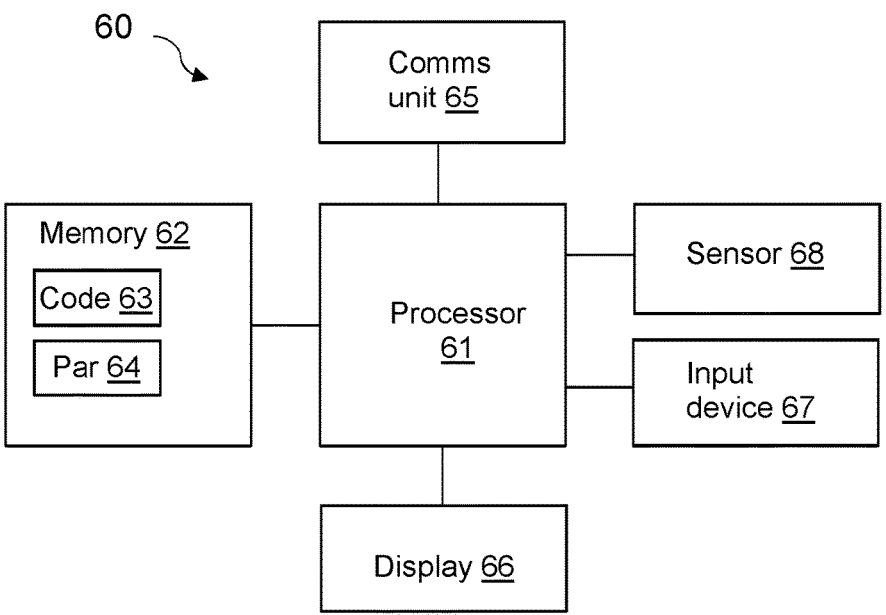
FIG. 6 illustrates an example apparatus capable of supporting at least some embodiments.

FIG. 6 illustrates a simplified example apparatus capable of supporting at least some embodiments of the present invention. Illustrated is a device 60, which may be configured to carry out at least some of the embodiments relating to the dust driving mode related operations illustrated above. In some embodiments, the device 60 comprises or implements the control unit 30, or other module(s), functions and/or unit(s) for performing at least some of the above-illustrated embodiments.

Comprised in the device 60 is a processor 61, which may comprise, for example, a single- or multi-core processor. The processor 61 may comprise more than one processor. The processor may comprise at least one application-specific integrated circuit, ASIC. The processor may comprise at least one field-programmable gate array, FPGA. The processor may be configured, at least in part by computer instructions, to perform actions.

The device 60 may comprise memory 62. The memory may comprise random-access memory and/or permanent memory. The memory may be at least in part accessible to the processor 61. The memory may be at least in part comprised in the processor 61. The memory may be at least in part external to the device 60 but accessible to the device.

The memory 62 may be means for storing information, such as parameters 64 affecting operations of the device. The parameter information in particular may comprise parameter information affecting the dust driving mode related features, such as threshold values.

The memory 62 may be a non-transitory computer readable medium comprising computer program code 63 including computer instructions that the processor 61 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device.

The device 60 may comprise a communications unit 65 comprising a transmitter and/or a receiver. The transmitter and the receiver may be configured to transmit and receive, respectively, i.a. data and control commands within or outside the mine vehicle. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, and/or Ethernet standards, for example. The device 60 may comprise a near-field communication, NFC, transceiver. The NFC transceiver may support at least one NFC technology, such as NFC, Bluetooth, or similar technologies.

The device 60 may comprise or be connected to a UI. The UI may comprise at least one of a display 66, a speaker, an input device 67 such as a keyboard, a joystick, a touch-screen, and/or a microphone. The UI may be configured to display views on the basis of above illustrated embodiments. A user may operate the device and control at least some of above illustrated features. In some embodiments, the user may control the mine vehicle 20 via the UI, for example to manually drive the vehicle, operate a boom, change driving mode, change display views, modify parameters 64, etc.

The device 60 may further comprise and/or be connected to further units, devices and systems, such as one or more sensor devices 68, such as the scanner(s) 40 or other sensor devices sensing environment of the device 60 or properties of the mine vehicle, such wheel rotation or orientation changes.

The processor 61, the memory 62, the communications unit 65 and the UI may be interconnected by electrical leads internal to the device 60 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processing core and at least one memory including computer program code, the at least one memory and the computer program code being configured to, with the at least one processing core, cause the apparatus at least to:

detect a dust condition affecting a scanner performing optical environment scanning to produce scanning data for scanning-based positioning of the autonomously operating mine vehicle at an underground worksite;

transition the mine vehicle operating in an automatic driving mode to a dust driving mode in response to detecting the dust condition, the dust driving mode being associated with one or more control actions for autonomous operation of the mine vehicle, wherein the dust driving mode includes or defines the one or more control actions applied for limiting autonomous driving of the mine vehicle;

control, during the dust driving mode, dead-reckoning based positioning for updating the position determined based on scanning-based positioning of the mine vehicle;

monitor a dead-reckoning error parameter during the dust driving mode;

in response to the dead-reckoning error parameter reaching an error threshold, control the mine vehicle to stop or reduce speed; and disable the dust driving mode in response to detecting a dust driving mode exit condition.

2. The apparatus of claim 1, wherein the computer program code is further configured to, with the at least one processing core, cause the apparatus to control speed reduction for the mine vehicle in response to entering the dust driving mode.

3. The apparatus of claim 1, wherein the computer program code is further configured to, with the at least one processing core, cause the apparatus to analyse scanner response signals obtained by performing the optical environment scanning, and detect the dust condition on the basis of the scanner response signal analysis.

4. The apparatus of claim 1, wherein the computer program code is further configured to, with the at least one processing core, cause the apparatus to disable obstacle detection function by the mine vehicle in response to entering the dust driving mode.

5. The apparatus of claim 1, wherein the computer program code is further configured to, with the at least one processing core, cause the apparatus to control a wheel block detection function in response to entering the dust driving mode, and control the mine vehicle to stop in response to detecting a wheel block by the wheel block detection function.

6. The apparatus of claim 1, wherein the computer program code is further configured to, with the at least one processing core, cause the apparatus to control collision detection function for the mine vehicle in response to entering the dust driving mode, and control the mine vehicle to stop in response to detecting a collision by the collision detection function.

7. The apparatus of claim 1, wherein the computer program code is further configured to, with the at least one processing core, cause the apparatus to detect the dust condition or enter the dust driving mode in response to detecting at least one of: the mine vehicle entering an area for which a dust driving mode has been defined in a route data or environment data processed for the mine vehicle, a signal from a dust detector indicative of the dust condition or causing the dust condition, or a number of detected points in an environment model identified based on the scanning falling below a threshold value.

8. The apparatus of claim 1, wherein the computer program code is further configured to, with the at least one processing core, cause the apparatus to monitor a time that the mine vehicle has been in the dust driving mode, and control the mine vehicle to stop in response to detecting that a maximum time for the dust driving mode is reached.

9. The apparatus of claim 1, wherein the computer program code is further configured to, with the at least one processing core, cause the apparatus to monitor an environment of the mine vehicle during the dust driving mode, and disable the dust driving mode in response to detecting a dust driving mode exit condition, wherein the dust driving mode is exited in response to again successfully positioning the mine vehicle based on the optical environment scanning or in response to detecting one or more dust condition parameters falling below a dust condition threshold.

10. The apparatus of claim 1, wherein the computer program code is further configured to, with the at least one processing core, cause the apparatus to define an indication of the dust condition and/or dust driving mode in route data or environment model at an area of the worksite where the dust condition was detected.

11. The apparatus of claim 1, wherein the computer program code is further configured to, with the at least one processing core, cause the apparatus to notify an operator of the dust condition or entering the dust driving mode.

12. The apparatus of claim 1, wherein the computer program code is further configured to, with the at least one processing core, cause the apparatus to determine position of the mine vehicle on the basis of comparison of tunnel profile data and reference profile data stored in an environment model to correct dead-reckoning based position before entering the dust driving mode and determine the position during the dust driving mode without positioning based on the optical environment scanning.

13. The apparatus of claim 1, wherein the computer program code is further configured to, with the at least one processing core, cause the apparatus to accumulate latitudinal error and longitudinal error in response to entering the dust driving mode, wherein the longitudinal error and the latitudinal error is estimated on the basis of recent historical error correction to dead-reckoning based on the optical environment scanning positioning before entering the dust driving mode.

14. The apparatus of claim 1, wherein the computer program code is further configured to, with the at least one processing core, cause the apparatus to detect availability of satellite-based positioning for the mine vehicle, and prevent entering the dust driving mode or disabling the dust driving mode when position of the mine vehicle is defined based on the satellite-based positioning.

15. The apparatus of claim 1, wherein the apparatus is an underground loading and/or hauling vehicle or an underground drilling rig.

16. A method for controlling autonomous mine vehicle operations, comprising the steps of:

detecting a dust condition affecting a scanner performing optical environment scanning to produce operational point cloud data for scanning-based positioning of an autonomously operating mine vehicle at an underground worksite;

transitioning the mine vehicle operating in an automatic driving mode to a dust driving mode in response to detecting the dust condition, the dust driving mode being associated with one or more control actions for autonomous operation of the mine vehicle, wherein the dust driving mode comprises or defines the one or more control actions applied for limiting autonomous driving of the mine vehicle;

controlling during the dust driving mode dead-reckoning based positioning for updating the position during the dust driving mode of the mine vehicle;

monitoring a dead-reckoning error parameter during the dust driving mode;

in response to the dead-reckoning error parameter reaching an error threshold, controlling the mine vehicle to stop or reduce speed; and disabling the dust driving mode in response to detecting a dust driving mode exit condition.

17. A non-transitory computer-readable medium comprising computer program code that, when executed in a data processing apparatus, causes a method in accordance with claim 16 to be performed.

* * * * *